United States Patent

Stappaerts

[11] Patent Number: 5,963,346
[45] Date of Patent: Oct. 5, 1999

[54] SCATTER NOISE REDUCTION IN HOLOGRAPHIC STORAGE SYSTEMS BY TWO-STEP WRITE

[75] Inventor: Eddy Alfons Stappaerts, San Ramon, Calif.

[73] Assignee: Northrop Grumman Corporation, Los Angeles, Calif.

[21] Appl. No.: 08/989,542

[22] Filed: Dec. 12, 1997

[51] Int. Cl.$^6$ .............................. G03H 1/02; G03H 1/10; G03H 1/12; G11C 13/04
[52] U.S. Cl. .................................. 359/3; 359/7; 359/10; 359/11; 465/122; 465/125
[58] Field of Search ............................ 359/1, 7, 11, 10, 359/3, 22; 365/122, 125; 369/112

[56] References Cited

U.S. PATENT DOCUMENTS

| | | | |
|---|---|---|---|
| Re. 30,166 | 12/1979 | Lee | 365/122 |
| 3,650,595 | 3/1972 | Gerritsen et al. | 350/3.5 |
| 3,698,010 | 10/1972 | Lee | 340/174 |
| 3,720,453 | 3/1973 | Lee et al. | 350/3.5 |
| 3,756,684 | 9/1973 | Fox | 350/3.5 |
| 3,785,712 | 1/1974 | Hannan | 350/3.5 |
| 3,867,009 | 2/1975 | Pawluczyk | 350/3.5 |
| 3,871,740 | 3/1975 | Matsubara et al. | 350/3.5 |
| 3,917,380 | 11/1975 | Kato et al. | 350/3.5 |
| 4,013,338 | 3/1977 | Sato et al. | 350/3.5 |
| 4,478,490 | 10/1984 | Wreede et al. | 350/162.11 |
| 4,674,824 | 6/1987 | Goddman et al. | 359/7 |
| 4,768,881 | 9/1988 | Juptner et al. | 356/347 |
| 4,945,528 | 7/1990 | Crasemann | 369/59 |
| 4,984,856 | 1/1991 | Moss et al. | 350/3.67 |
| 5,016,953 | 5/1991 | Moss et al. | 350/3.66 |
| 5,105,287 | 4/1992 | Moss et al. | 359/3 |
| 5,223,355 | 6/1993 | Hampp et al. | 430/1 |
| 5,299,035 | 3/1994 | Leith et al. | 359/9 |
| 5,337,170 | 8/1994 | Khoury et al. | 359/7 |
| 5,363,363 | 11/1994 | Gage | 369/116 |
| 5,491,682 | 2/1996 | Dohmeier et al. | 369/124 |
| 5,684,588 | 11/1997 | Khoury et al. | 359/10 |
| 5,859,713 | 1/1999 | Khoury et al. | 359/10 |

*Primary Examiner*—Cassandra Spyrou
*Assistant Examiner*—Audrey Chang
*Attorney, Agent, or Firm*—Terry J. Anderson; Karl J. Hoch, Jr.

[57] ABSTRACT

A method and an apparatus for increasing detection signal-to-noise ratio of a holographic image by compensating for noise characteristics of a holographic storage medium are disclosed. The method comprises the following steps: (a) inputting a first input image into the holographic storage medium; (b) storing the first input image in the holographic storage medium; (c) reading out the stored first input image from the holographic storage medium as a first output image; (d) recording the first output image on an output recording device, the first output image deviating from the first input image due to noise characteristics of the holographic storage medium; (e) comparing the first output image to the first input image to derive relative phase shift data; (f) inputting a second input image into the holographic storage medium, the second input image being formed by modifying the first input image in response to the derived relative phase shift data; (g) storing the second input image in the storage medium such that the stored second input image is combined with the stored first input image to produce a stored combined image; and (h) reading out the stored combined image from the holographic storage medium as a second output image. The second output image is approximately identical to the desired output image which would be obtained in the absence of scatter noise.

14 Claims, 2 Drawing Sheets

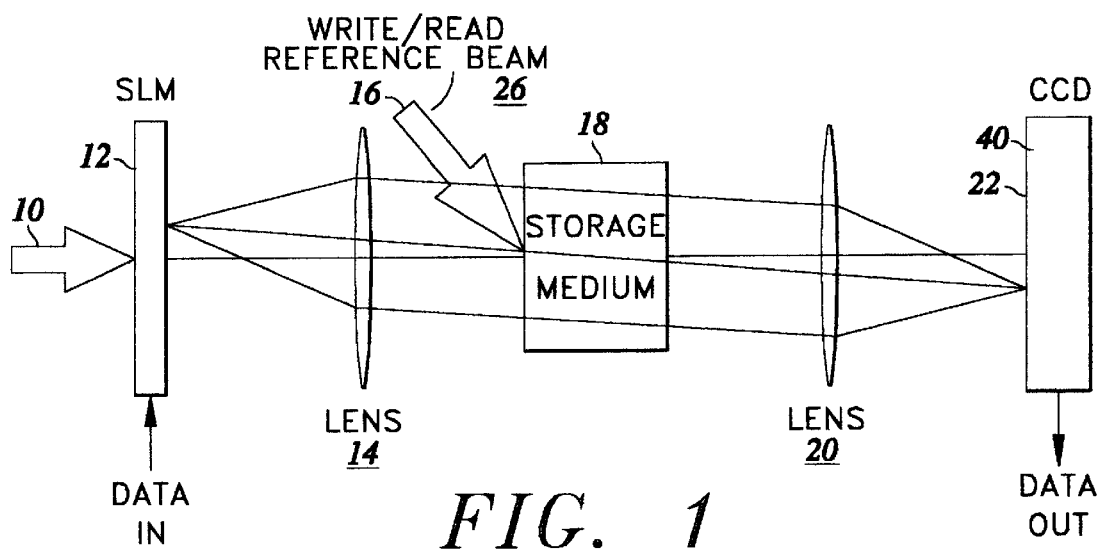
FIG. 1
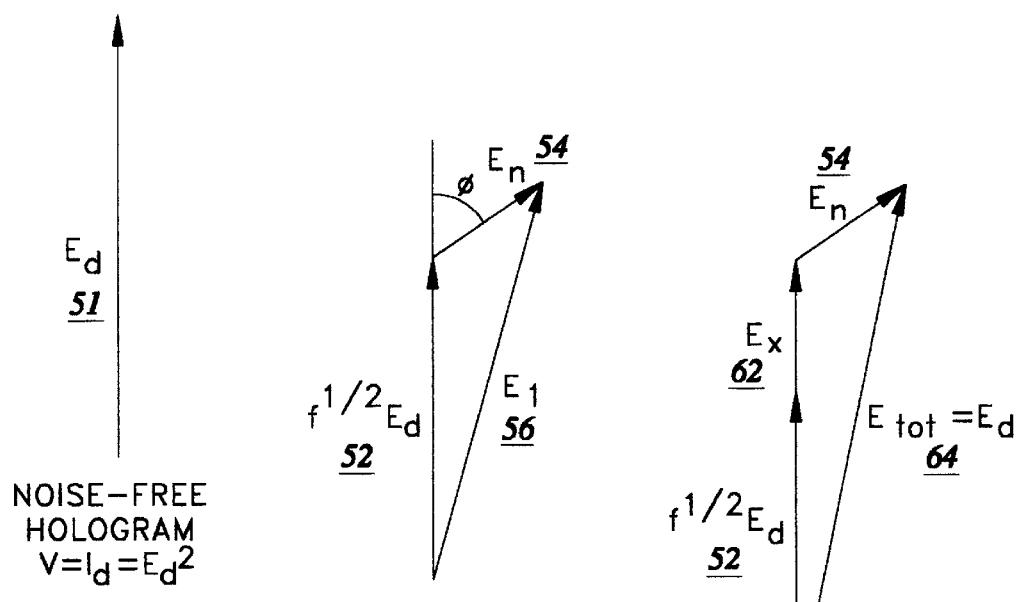
FIG. 2a NOISE-FREE HOLOGRAM $V = I_d = E_d^2$
FIG. 2b STEP-1 HOLOGRAM $V_1 = E_1^2$
FIG. 2c STEP-3 HOLOGRAM $V = E_{tot}^2 = E_d^2$

SCATTER NOISE REDUCTION IN HOLOGRAPHIC STORAGE SYSTEMS BY TWO-STEP WRITE

FIELD OF THE INVENTION

The present invention relates generally to methods and apparatuses for improving the performance of holographic storage systems, and more particularly to a method and an apparatus for reducing the effect of detection noise due to optical scattering in a holographic storage medium.

BACKGROUND OF THE INVENTION

It is well known that holography can be used to store massive digital data in a small storage volume, such as a photo-refractive crystal, for a later readout.

A number of configurations exist for holographic storage systems, particularly with respect to the multiplexing techniques used for maximizing storage density. A commonly used configuration is shown in FIG. 1. The primary components of this system are an input device, a holographic storage medium such as a photo-refractive crystal, and an output device. The input device, usually implemented by a spatial light modulator (SLM), consists of an array of amplitude modulators. The output device is a detector array such as a charge-coupled-device (CCD) which receives the output radiation from the storage medium during a hologram readout.

During a hologram-write operation, data are inputted into the SLM in the form of amplitude modulations of the pixels of the SLM. A laser beam illuminates the SLM, and the resulting object beam emanating from the SLM pixels interferes with a write reference beam in the storage medium to create a large number of gratings, one for each SLM pixel. During a hologram-readout operation, a read reference beam illuminates the storage medium, resulting in reflected radiation from each of the stored gratings. The radiation from each grating is detected by a CCD pixel. As an example, for a SLM and a CCD with 1024 by 1024 pixels each, a single hologram (page) stores 1024×1024=1 Mbit of binary data per page. If more than two gray levels are used, the data per page increases by the number of bits. Thus, for 16 gray levels (4 bits), the storage density increases by a factor of four, to 4 Mbits per page in the above example.

Noise sources in holographic storage systems have a number of physical origins. The primary sources are (1) light scattered from the storage medium, (2) light scattered from optical components, (3) intra-page pixel crosstalk, (4) inter-page crosstalk and (5) detector noise. Intra-page and inter-page crosstalk can be reduced by conventional design techniques, at the cost of some decrease in storage density. Light scattered from optical components can also be minimized using conventional techniques. However, it is more difficult to reduce the effect of light scattered from the storage medium, called scatter noise, which severely affects the detection signal-to-noise ratio (SNR), a critical parameter directly linked to the performance of holographic storage systems.

When the holographic storage medium is illuminated by the read reference beam, the detectors receive electric fields from both the stored data and from optical scatterers. Scattering from optical components, external to the holographic storage medium, can be minimized using conventional techniques such as anti-reflection coatings. However, scattering from the storage medium itself represents a much more difficult problem since it originates within the same physical volume as the data and since its spectral characteristics are identical to those of the data electric field.

Furthermore, in some storage media such as iron-doped $LiNbO_3$, scatter noise has been observed to increase with increasing iron doping level. A higher iron concentration is desirable because it improves other system parameters such as hologram erasure time. Thus, reduction of scatter noise will allow other system parameters to be optimized. The invention decouples the effect of scatter noise from such other design considerations, thereby enabling improved overall system performance.

The present invention discloses a method and an apparatus for writing data information into the holographic storage medium such that the detected scatter noise component of the electric field emerging from the holographic storage medium is substantially reduced. Specifically, the invention reduces scatter noise which has the characteristics of laser speckle. The scatter noise intensity is a random complex variable with finite mean. The voltage recorded by each pixel of the CCD array during a hologram readout, due to incident data signal and noise electric fields, can be written in complex variable notation as:

$$V \sim |E_d + E_n e^{i\phi}|^2 \quad (1)$$

or $$V \sim E_d^2 + 2E_d E_n \cos(\phi) + E_n^2 \quad (2)$$

where $E_d$ and $E_n$ are the magnitudes of the data and scatter noise electric fields, respectively, and $\phi$ is their relative phase shift. The proportionality constant between the detected voltage V and the right hand side of Equation (2) depends on detector characteristics and other system parameters. Since its value is not important, it will be set equal to unity for all discussions that follow. If the scatter noise is due to a large number of stationary sites in the holographic storage medium, then it has the characteristics of laser speckle. In that case the scatter noise intensity, $I_n$, which is equal to $E_n^2$, is a random variable with an exponential probability distribution and the phase, $\phi$, is uniformly distributed in the interval $[-\pi,\pi]$. The probability density function of the scatter noise intensity $I_n$ is:

$$p(I_n) = \frac{1}{\langle I_n \rangle} e^{-\frac{I_n}{\langle I_n \rangle}} \quad (3)$$

where $\langle I_n \rangle$ denotes the average value of $I_n$. Although the present invention is described for the case where the scatter noise electric field has the characteristics of speckle, it has general applicability, regardless of the statistics of the scatter field.

According to Equation (2), the scatter noise has two contributions, represented by the second and third terms on the right hand side of Equation (2). In a practical system, $E_n$ is much smaller than $E_d$, and the second term dominates the expression for scatter noise. As an example, for $E_n^2/E_d^2 = 10^{-2}$, $V \sim 1 + 0.2^* \cos(\phi) + 0.01$. For $\phi$ near 0 or $\pi$, the maximum noise voltage is 0.01 without the second term, and approximately ±0.2 with the second term included. The corresponding voltage SNR is 100 in the first case and only 5 in the second case. The present invention discloses a method and an apparatus for greatly decreasing the second term of Equation (2) and thereby increasing the detection signal-to-noise ratio.

SUMMARY OF THE INVENTION

A method and an apparatus for increasing detection signal-to-noise ratio of a holographic image by compensating for noise characteristics of a holographic storage medium are disclosed. The method comprises the following steps: (a) inputting a first input image into the holographic storage medium; (b) storing the first input image in the holographic storage medium; (c) reading out the stored first input image from the holographic storage medium as a first output image; (d) recording the first output image on an output recording device, the first output image deviating from the first input image due to noise characteristics of the holographic storage medium; (e) comparing the first output image to the first input image to derive relative phase shift data; (f) inputting a second input image into the holographic storage medium, the second input image being formed by modifying the first input image in response to the derived relative phase shift data; (g) storing the second input image in the holographic storage medium such that the stored second input image is combined with the stored first input image to produce a stored combined image; and (h) reading out the stored combined image from the holographic storage medium as a second output image. The second output image is approximately identical to the desired output image which would be obtained in the absence of scatter noise.

In the preferred embodiment of the present invention, the stored second input image is superimposed on and in phase with the stored first input image in the holographic storage medium to produce the stored combined image.

The first input image is stored in the holographic storage medium with a first strength level which determines the intensity level of the first output image. The first strength level is chosen to be a fraction of the final strength level which is the strength level of the stored combined image. This final strength level determines the intensity level of the second output image.

The signal-to-noise ratio of the second output image is substantially greater than that of a test output image resulting from reading a test input image, which is formed by inputting the first input image into the holographic storage medium with a strength level equal to the final strength level.

The first input image comprises an array of input pixels. The first output image comprises an array of output pixels. The relative phase shift data are computed according to the following formula:

$$a = \frac{V_1 - fI_d}{2\sqrt{fI_d}}$$

where a is a relative phase shift datum associated with an output pixel and a corresponding input pixel, $V_1$ is the associated output pixel value and $fI_d$ is the expected detection value of the corresponding input pixel.

The apparatus of the present invention comprises a data input device for providing an array of pixels, a radiation source for providing a write reference beam during each of the two hologram-write operations and for providing a read reference beam, a holographic storage medium, a detector array for recording a hologram output pattern, and a computing circuit for computing a scatter parameter for each of the pixels and for computing an optimum value for each of the pixels.

The data input device is preferably a spatial light modulator with sufficient resolution to facilitate the signal-to-noise ratio improvement enabled by the method of the present invention. The radiation source is preferably a laser source. The detector array is preferably a charge-coupled device. The computing circuit is preferably a high speed signal processor circuit.

The present invention provides a method for practically eliminating or substantially reducing the second term of Equation (2). This is accomplished by writing each data hologram in two steps instead of a single step as in the conventional technique. Information extracted from a partial strength hologram written in the first step is used to optimize the hologram strength of the second write step such that the effect of scatter noise is greatly reduced in subsequent readouts. The two holograms are added in phase.

The basis concept of the invention is illustrated in FIGS. 2a, 2b, and 2c. The figures show complex variable phasor diagrams for the detected electric fields. All noise sources except for optical scattering are assumed to be negligible. The diagrams apply to individual holographic gratings in the holographic storage medium, one grating for each pixel of the spatial light modulator of FIG. 1.

FIG. 2a applies to the case of no scatter noise. In that case, the detector voltage is proportional to the data intensity, $V \sim I_d = E^2_d$. The proportionality constant between the detector voltage and the incident light intensity depends on a number of system parameters. Since its value is not important for the discussion, it will be set equal to unity such that $V = I_d$.

In step (a), a first input image is contained in the first object beam which illuminates the holographic storage medium. In step (b), the first input image is written into the holographic storage medium by interfering a write reference beam with the first object beam. The first input image is written with a strength $fI_d$ which is a fraction of the strength of the data to be stored. Hologram strength is defined as the noise-free detector voltage generated at a subsequent hologram readout. Thus, hologram strength of an input image determines the intensity level of the corresponding output image at a subsequent hologram readout. In step (c), this stored first input image is read out by illuminating the storage medium with a read reference beam. The resulting electric field incident on a detector pixel has two components as shown in FIG. 2b. The first component, with magnitude $f^{1/2} E_d$, is the electric field due to the stored data. The second component, $E_n$, is the electric field due to scatter noise. A random phase shift, $\phi$, exists between the two components. The detected voltage is equal to the square of the total electric field, $V_1 = E^2_1$. Due to the scatter noise, this voltage is different from the expected value $fI_d$ which would be obtained in the absence of scatter noise. From this difference, the scatter parameter $E_n \cos(\phi)$ of Equation (2) is calculated in step (e).

In step (f), a second input image is formed by modifying the first input image in accord with the scatter parameters computed in step (e).

In step (g), the second input image is superimposed on the first one, as shown in FIG. 2c. The second input image is in phase with the first one to form a stored combined image. The strength of this second image, $I_x = E^2_x$, is set such that, in subsequent readouts of the stored combined image, the detector voltage in the presence of scatter noise is equal to the expected noise-free detection value corresponding to the stored data, $V = I_d$. This is made possible by the fact that the scatter noise electric field, characterized by the parameters $(E_n, \phi)$, is constant for a given interaction geometry and laser beam parameters. The scatter noise electric field is therefore the same for step 2 and for subsequent memory readouts.

The invention imposes a stability requirement on the memory optical system. For the holograms written in steps (b) and (g) to add optimally, the pathlength difference between the write reference beam and the first object beam must be the same as the pathlength difference between the write reference beam and the second object beam to within a fraction of a wavelength of the write reference beam. The invention increases the time required for hologram write, but it does not impact the time required for hologram readouts. Finally, the invention requires that the scatter characteristics be approximately constant after a hologram-write, and that hologram strength, during the period that data are read from the storage medium, not change significantly from a bias value for which the strength of the second hologram is optimized.

The present invention increases detection signal-to-noise ratio (SNR) and thereby reduces bit-error-rate (BER). The improved SNR enables an increase in the number of bits stored per hologram and thereby increases storage density. The technique requires that the scatter characteristics remain approximately constant after hologram write, and that hologram strength not vary significantly from some bias value during the period that data are read from the storage medium.

BRIEF DESCRIPTION OF THE DRAWINGS

FIG. 1 shows the schematic of a holographic storage system.

FIGS. 2a, 2b, and 2c show complex variable phasor diagrams illustrating the two-step hologram-write method of the present invention;

In FIG. 3, f=0.25 and a=0.1. At the bias point, the initial (bias) hologram strength at readout is equal to its value at the time of write, i.e., $\eta_{bias}=1$.

In FIG. 4, f=0.25 and a=0.1. At the bias point, the initial (bias) hologram strength at readout is 40 percent of its value at the time of write, i.e., $\eta_{bias}=0.4$.

DETAILED DESCRIPTION OF THE INVENTION

Figure 3:
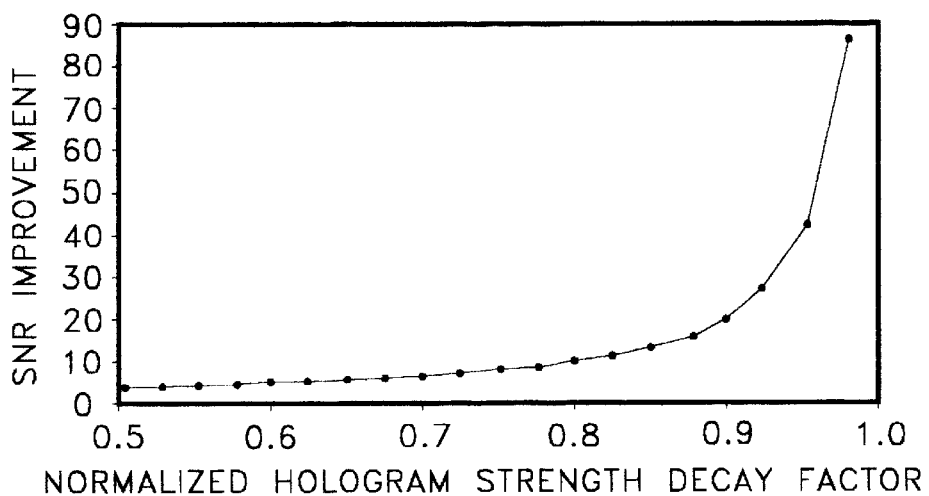
FIG. 3 shows how the signal-to-noise ratio improvement (in percentage) made possible by the invention varies near the bias point, i.e., where the normalized hologram strength is equal to 1.

The detailed description set forth below in connection with the appended drawings is intended as a description of the presently preferred embodiment of the invention, and is not intended to represent the only forms in which the present invention may be constructed or utilized. The description sets forth the functions and the sequence of the steps for constructing and operating the invention in connection with the illustrated embodiment. It is to be understood, however, that the same or equivalent functions may be accomplished by different embodiments that are also intended to be encompassed within the spirit and scope of the invention.

The present invention relates to the commonly used holographic storage architecture depicted in FIG. 1. Typical components of this architecture include a spatial light modulator (SLM) 12, a holographic storage medium 18, and an charged-coupled-device (CCD) detector array 40. During hologram-write operation, data are inputted into the SLM 12 in the form of amplitude modulations of the pixels of the SLM's array. A laser beam 10 illuminates the SLM 12, passes through a collimating lens 14, and interferes with a write reference beam 16 in the storage medium 18 to create a large number of gratings, one for each SLM pixel. During a conventional hologram-read operation, a read reference beam 26, typically co-propagating with the write reference beam 16 as shown in FIG. 1, illuminates the storage medium 18, resulting in reflected radiation from each of the storage gratings. The radiation from each pixel grating passes through a focusing lens 20 and produces an output pattern 22 at the focal plane of the focusing lens. A CCD detector array 40 records the intensity of the output pattern 22. The aforementioned architecture and operations are well established and thus constitute prior art.

The present invention discloses a new method for writing the data information into the holographic storage medium 18 such that the scatter noise component of the electric field emerging from holographic storage medium during a subsequent hologram-read operation is reduced. Specifically, the invention reduces the effect of scatter noise which has the characteristics of laser speckle.

The method of the present invention comprises three operational steps, hereafter called step 1, step 2, and step 3. The following description makes some simplifying assumptions which do not impact the basic concept of the method.

Hologram strength is defined as the noise-free detector voltage generated at hologram readout. The full hologram strength corresponds to the strength of the data to be stored. For example, if data represented by 16 gray levels in the spatial light modulator 12 are stored at full strength in the storage medium 18, then the detected hologram output pattern 22 at the CCD 40 is also represented by the same 16 gray levels. If data at a SLM pixel is stored at full strength in the storage medium 18, then the noise-free detected voltage at the corresponding CCD pixel is $I_d=E_d^2$. FIG. 2a illustrates the phasor representation of the noise-free electric field $E_d$ 51.

In step 1, instead of writing a hologram of full strength $I_d=E_d^2$ as in a conventional hologram-write, a first hologram of partial strength $fI_d$, where f is a fraction (0<f<1), is written into the storage medium 18.

In step 2, the first partial strength hologram is read by illuminating the storage medium 18 with the read reference beam 26. According to Equation (2), assuming that the $E_n^2$ term is negligible and setting the proportionality constant to 1, the detected voltage at a CCD pixel is:

$$V_1 = fI_d + 2\sqrt{fI_d}\, E_n \cos(\phi) \qquad (5)$$

where $fI_d$ represents the fractional hologram strength due to the stored data. FIG. 2b illustrates the corresponding phasor addition of the electric fields $f^{1/2}E_d$ 52 and $E_n$ 54 resulting in the detected field $E_1$ 56. It is assumed that the first partial hologram strength $fI_d$, i.e., the detected data signal voltage, be sufficiently high so that the detector noise, i.e., noise due only to the detector 40, can be neglected. From a comparison of the measured voltage, $V_1$, and the predicted voltage, $fI_d$, which would be obtained in the absence of scattering, the scatter parameter $a=E_n \cos(\phi)$ is calculated as follows:

$$a = \frac{V_1 - fI_d}{2\sqrt{fI_d}} \qquad (6)$$

The voltage $fI_d$ is calculated from the known data and the hologram diffraction efficiency. The diffraction efficiency can be calculated from the system parameters or it can be measured. The invention is based on the fact that the scatter parameter is constant if the interaction geometry and laser beam parameters are the same in step 2 and in subsequent memory readouts. In other words, the invention makes use of the fact that, even though the scatter field intensity $E_n$ and phase $\phi$ are random variables, the characteristics ($E_n$, $\phi$) are repeatable from read pulse to read pulse, i.e., from one hologram-read operation to the next, if the interaction geometry and laser beam parameters are kept the same.

In step 3, a second hologram-write is performed. The strength of this second hologram is set such that, when the combined hologram of steps 1 and 3 is read, the effect of scatter noise is practically eliminated or greatly reduced. If there is a change, $\alpha$, in the pathlength difference between the reference write beam and the object beam, between the two write operations, then the detector voltage for the combined hologram is:

$$V = \left| \sqrt{\eta f I_d} + \sqrt{\eta I_x} \, e^{i\alpha} + E_n e^{i\phi} \right|^2 \qquad (7)$$

or, for the optimum case where $\alpha=0$:

$$V = \eta f I_d + \eta I_x + 2\sqrt{\eta f I_d}\sqrt{\eta I_x} + 2a\left(\sqrt{\eta f I_d} + \sqrt{\eta I_x}\right) \qquad (8)$$

where $\eta$ is a hologram efficiency decay parameter. This parameter has a value of unity at the time of hologram write but decreases with time due to optical erasure by subsequent write and read operations and due to non-optical processes (dark storage decay). $I_x$ represents the strength of the second grating at the time it is written. Its optimum value is calculated from the requirement that hologram readouts recover the data intensity $I_d$ reduced by the hologram decay factor $\eta$:

$$V = \eta I_d \qquad (9)$$

Equations (8) and (9) can be solved for $I_x$. The result is:

$$I_x = \left[ -\left(\sqrt{f I_d} + \frac{a}{\sqrt{\eta}}\right) + \sqrt{I_d + \frac{a^2}{\eta}} \right]^2 \qquad (10)$$

In the absence of scatter noise ($a=0$), and before any hologram decay, i.e., $\eta=1$, Equation (10) yields:

$$I_x = I_d (1 - \sqrt{f})^2 \qquad (11)$$

Equation (11) shows that, if $f=0.25$, then the detected voltages for the step 1 hologram and step 3 hologram would be the same, i.e., $f I_d = I_x$. This confirms the fact that a doubling in hologram strength, i.e., writing twice with the same hologram strength, doubles the read output electric field and therefore quadruples its intensity.

As a numeric example, consider $I_d=1$, $a=0.1$, and $f=0.25$. For hologram readout before decay, $\eta=1$, the strengths of the step 1 and step 3 holograms are:

Hologram 1: $f I_d = 0.25$ (12)

and,

Hologram 2: $I_x = 0.16$ (13)

Substitution of Equations (12) and (13) into Equation (8) yields $V=1$. This shows that the readout exactly recovers the data stored, without scatter noise.

The corresponding phasor addition of the electric fields is illustrated in FIG. 2c, where the total electric field $E_{tot}$ 64, equal to $E_d$ 51, is obtained by the addition of the electric fields $f^{1/2}E_d$ 52, $E_x$ 62, and $E_n$ 54. In practice, this ideal operation will not be realized exactly because of the simplifying assumptions made in the analysis. These include the assumptions that the $E_n^2$ term in Equation (2) and the detector noise are negligible. In practice, detector noise introduces an error in the calculation of the optimum value of the second hologram strength.

The decay time of the stored holograms, characterized by the parameter $\eta$, is a function of the storage medium and other parameters. Ideally, the storage time is sufficiently long such that $\eta$ is equal to 1 for the entire duration that holograms will be read. In that case, the strength of the second hologram, $I_x$, is calculated using $\eta=1$.

With many storage media, the parameter $\eta$ decreases significantly with time due to writing of additional holograms, reading of holograms, and dark storage decay in the absence of any optical radiation. In such case, the technique of the invention can still be used effectively if $\eta$ varies in a narrow, pre-determined range during memory readout. More specifically, the value for $\eta$, to be used in calculating the strength of the second hologram using Equation (10), is the projected value of $\eta$ at the time of hologram readout.

Figure 4:
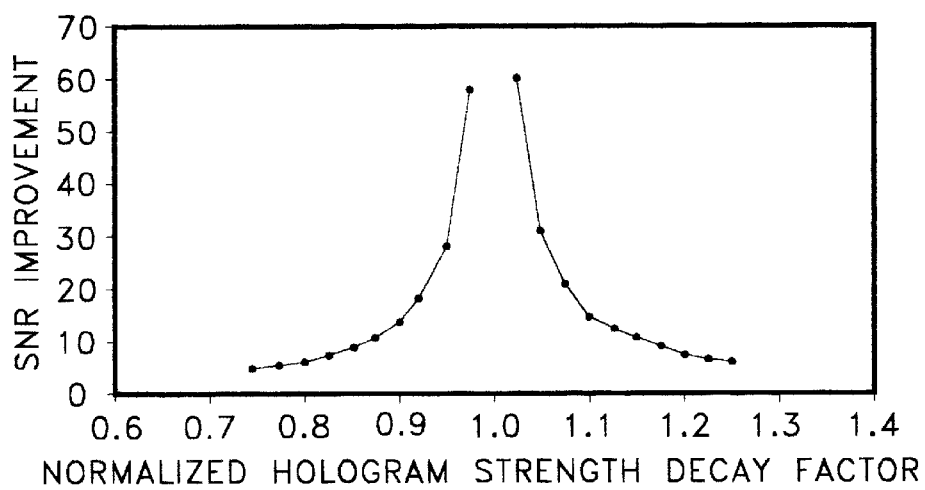
FIG. 4 shows how the signal-to-noise ratio improvement (in percentage) made possible by the invention varies near the bias point, i.e., where the normalized hologram strength is equal to 1, for a different value of η.

As an example, in a photorefractive storage medium such as $LiNbO_3$, the strength of stored holograms decreases in a predictable way as additional holograms are written in the same volume. Exposure schedules have been developed such that, after all holograms in a given storage volume have been written, they have similar strengths. This is accomplished by writing the earlier holograms with larger strengths such that, after partial erasure by subsequent write operations, they decay to a pre-determined strength. Hologram strength may decay further during read operations depending on the medium characteristics, readout technique, and treatment (for example, thermal fixing) of the holograms. FIGS. 3 and 4 show how the signal-to-noise ratio (SNR) improvement, expressed in percentage, made possible by the invention varies near the bias point, i.e., where the normalized hologram strength is equal to 1. In both figures, $f=0.25$ and $a=0.1$. In FIG. 3, the initial (bias) hologram strength at readout is equal to the hologram strength at the time of hologram-write, i.e., $\eta=1$. In FIG. 4, the bias hologram strength at readout is 40 percent of its value at the time of write, i.e., $\eta=0.4$. The very large SNR enhancements close to the bias point cannot be realized in practice because of the simplifying assumptions made in the analysis, regarding the $E_n^2$ term in Equation (2) and the detector noise. In practice, the nonzero detector noise introduces an error in the calculation of the optimum strength of the second hologram.

Figure 5:
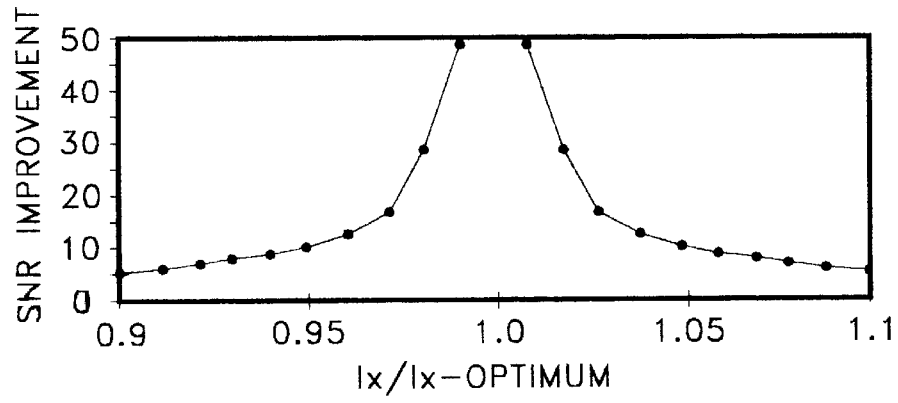
FIG. 5 shows the signal-to-noise ratio improvement (in percentage), as a function of the second hologram strength which is normalized by its optimum value.

The SNR improvement realizable using the method of the invention depends on the accuracy of the strength, $I_x$, of the second hologram. This accuracy is limited by parameters such as detector noise and the finite resolution of the spatial light modulator. FIG. 5 shows how the SNR improvement decreases from its maximum value at the optimum second hologram strength given by Equation (10), i.e., where the normalized second hologram strength $I_x/I_x$ optimum is equal to 1.

It is understood that the exemplary holographic storage systems described herein and shown in the drawings represent only presently preferred embodiments of the invention. Indeed, various modifications and additions may be made to such embodiments without departing from the spirit and scope of the invention. Those skilled in the art will recognize that various other physical or optical configurations are equivalent and therefore likewise suitable. Thus, these and other modifications and additions may be obvious to those skilled in the art and may be implemented to adapt the present invention for use in a variety of different applications.

What is claimed is:

1. A method for increasing detection signal-to-noise ratio of a holographic image by compensating for noise characteristics of a holographic storage medium, the method comprising the steps of:

(a) inputting a first input image into the holographic storage medium;

(b) storing the first input image in the holographic storage medium;

(c) reading out the stored first input image from the holographic storage medium as a first output image;

(d) recording the first output image on an output recording device, the first output image deviating from the first input image due to noise characteristics of the holographic storage medium;

(e) comparing the first output image to the first input image to derive relative phase shift data;

(f) inputting a second input image into the holographic storage medium, the second input image being formed by modifying the first input image in response to the derived relative phase shift data;

(g) storing the second input image in the holographic storage medium such that the stored second input image is combined with the stored first input image to produce a stored combined image; and (h) reading out the stored combined image from the holographic storage medium as a second output image.

2. The method as recited in claim 1 wherein the stored second input image is superimposed on and in phase with the stored first input image in the holographic storage medium to produce the stored combined image.

3. The method as recited in claim 1 wherein the first input image is stored in the holographic storage medium with a first strength level, the first strength level determining intensity level of the first output image, the first strength level being a fraction of a final strength level, and wherein the stored combined image has a strength level equal to the final strength level, the final strength level determining intensity level of the second output image.

4. The method as recited in claim 3 wherein the second output image has a greater signal-to-noise ratio than that of a test output image resulting from reading a test input image, the test input image being formed by inputting the first input image into the holographic storage medium with a strength level equal to the final strength level.

5. The method as recited in claim 1 wherein the first input image comprises an array of input pixels and the first output image comprises an array of output pixels, and wherein the relative phase shift data are computed according to the following formula:

$$a = \frac{V_1 - fI_d}{2\sqrt{fI_d}}$$

where a is a relative phase shift datum associated with an output pixel and a corresponding input pixel, $V_1$ is the associated output pixel value and $fI_d$ is an expected detection value of the corresponding input pixel.

6. A hologram-write method for increasing detection signal-to-noise ratio by compensating for scatter noise originating from a holographic storage medium, the method comprising the steps of:

(a) inputting first input data into an input device having M pixels, each input device pixel containing a first data value corresponding to a first expected detection value;

(b) outputting a first object beam, containing first input data, from the input device;

(c) interfering a write reference beam with the first object beam to write a first input image into the holographic storage medium;

(d) illuminating the holographic storage medium with a read reference beam propagating along the centerline of the write reference beam to produce a first output image;

(e) recording the first output image on a detector array having at least M pixels, each detector array pixel corresponding to an input device pixel and containing a recorded value, the recorded values deviating from the corresponding first expected detection values due to scatter noise originating from the holographic storage medium;

(f) computing a scatter parameter associated with each detector array pixel, from the recorded value of the associated detector array pixel and the first expected detection value associated with a corresponding input device pixel;

(g) inputting second input data into the input device, the second input data being formed by modifying amplitude of each input device pixel first data value according to the associated scatter parameter;

(h) outputting a second object beam, containing the second input data, from the input device;

(i) interfering the write reference beam with the second object beam to write a second input image into the holographic storage medium, the second input image being superimposed on and in phase with the first input image to produce a combined image, said combined image comprised of a set of M gratings, each of the M gratings having a final expected detection value, and wherein each of the first expected detection values is equal to a fraction of a corresponding final expected detection value;

(j) illuminating the holographic storage medium with said read reference beam propagating along the centerline of the write reference beam to produce a final output image having substantially reduced scatter noise; and (k) recording the final output image on the detector array.

7. The method as recited in claim 6 wherein the scatter parameter is computed according the following formula:

$$a = \frac{V_1 - fl_d}{2\sqrt{fl_d}}$$

where a is the scatter parameter, $V_1$ is the recorded value of the associated detector array pixel, and $fl_d$ is the first expected detection value associated with the corresponding input device pixel.

8. The method as recited in claim 6 wherein the difference between the pathlength of the write reference beam and the pathlength of the first object beam is approximately equal to the difference between the pathlength of the write reference beam and the pathlength of the second object beam.

9. The method as recited in claim 6 wherein the input device comprises a spatial light modulator.

10. A holographic storage system for increasing detection signal-to-noise ratio, the system facilitating a two-step hologram-write operation to reduce detection scatter noise, the system comprising:

(a) an input device for receiving first and second input data, for outputting a first object beam containing first input data during a first hologram-write operation, and for outputting a second object beam containing second input data during a second hologram-write operation;

(b) a radiation source for outputting a read reference beam, and a write reference beam during each of the first and second hologram-write operations, the write reference beam interfering with the first and the second object beams to produce a first and a second input image, respectively;

(c) a holographic storage medium for storing the first input image, the second input image and a combined output image created by superimposing in phase the first and the second input images, and for outputting with the read reference beam the combined output image and a first output image created by the first input image;

(d) a detector array for recording the first output image and the combined output image; and (e) a computing circuit for computing a scatter parameter for each pixel of the detector array wherein the scatter parameter is computed according to the following formula:

$$a = \frac{V_1 - fl_d}{2\sqrt{fl_d}}$$

where a is the scatter parameter, $V_1$ is a recorded value of the associated detector array pixel for the first output image, and $fl_d$ is an expected detection value for the first output image associated with a corresponding input device pixel, and the second input data is then formed by modulating the first input data according to the associated scatter parameter at each input device pixel.

11. The system as recited in claim 10 wherein the computing circuit comprises a high-speed signal processor circuit.

12. The system as recited in claim 10 wherein the detector array comprises a charge-coupled device.

13. The system as recited in claim 10 wherein the input device comprises a spatial light modulator.

14. The system as recited in claim 10 wherein the radiation source comprises a laser source.

* * * * *